March 11, 1969  R. A. HANMER  3,431,673

TOY VEHICLE WITH SELF-STEERING MECHANISM

Filed Nov. 2, 1966

United States Patent Office 3,431,673
Patented Mar. 11, 1969

3,431,673
TOY VEHICLE WITH SELF-STEERING
MECHANISM
Richard Alan Hanmer, San Anselmo, Calif., assignor to
The Lazy Eight (∞) Inc., Cambridge, Mass., a corporation of Massachusetts
Filed Nov. 2, 1966, Ser. No. 591,642
U.S. Cl. 46—208                                9 Claims
Int. Cl. A63h 17/42, 17/26

This invention relates to driverless automotive vehicles (e.g. toy racing cars).

Toy racing cars as normally employed require some sort of external restraint such as a track or remote steering arrangement to cause them to follow a predetermined path. Such external restraints add to the expense of the cars and place limitations upon their use.

Objects of the invention are to provide a vehicle such as a toy car that will travel at high speed in a substantially straight line, without external guidance or control, over a variety of travel surfaces having varying degrees of irregularity and bumpiness; to realistically simulate, in a toy car, the straight ahead travel of an actual racing car; to provide such a vehicle that will travel straight ahead for a selected distance and then automatically shut off its engine or motor and brake itself to a stop; and to provide all the above in a simple, reliable and inexpensive structure.

In general the invention features a pair of unsprung front wheels rigidly directed or aimed for generally straight ahead travel, at least one and preferably both front wheels being driven, and an unsprung non-driven (idler) rear wheel unit, which may include one or more wheels, mounted for rocking movement about a single longitudinal axis of the vehicle perpendicular to the axis of the driven wheels, the location of the connection of the rear wheel unit being chosen so that the load on each of the front wheels is equal during movement of the vehicle along a travel surface, the weight distribution (hence load on the wheels) being substantially independent of the instantaneous angular position of the rear wheel unit about the axis. In this way straight line movement is preserved despite a bumpy and uneven travel surface.

Other objects, features, and advantages will appear from the following description of a preferred embodiment of the invention, taken together with the attached drawings thereof, in which.

Figure 1:
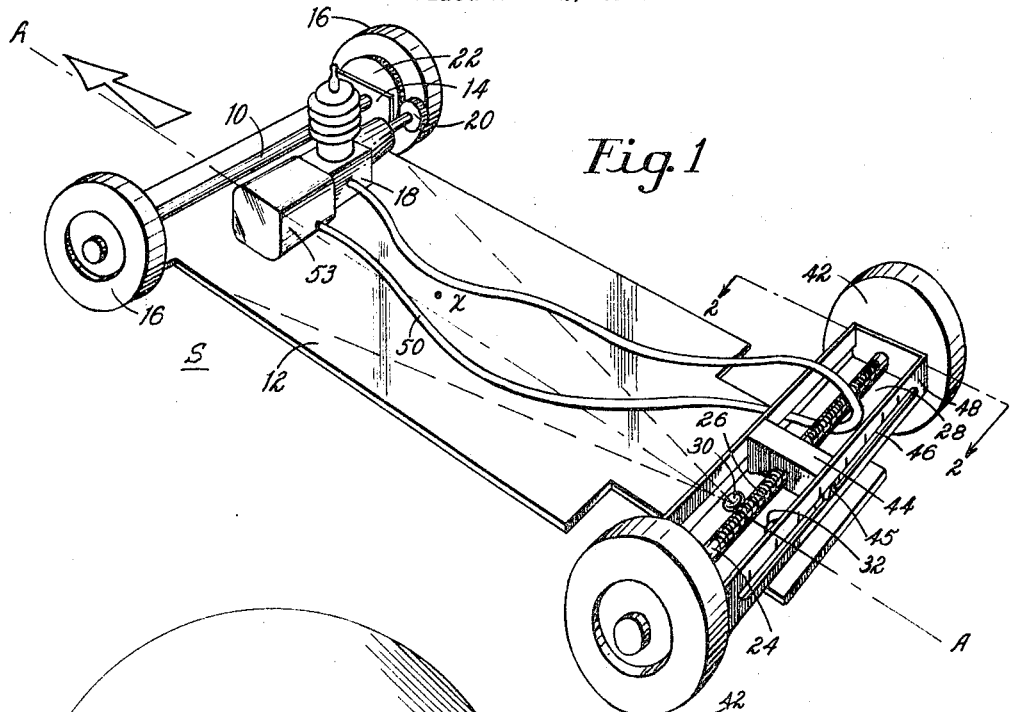
FIG. 1 is a perspective view of the vehicle of the invention.

Solid front axle 10 is journaled on frame 12 in flanges 14 and carries keyed to it front wheels 16, 16 which are aimed straight ahead. Gasoline motor 18 drives axle 10 and wheels 16, 16 through gears 20, 22.

Figure 2:
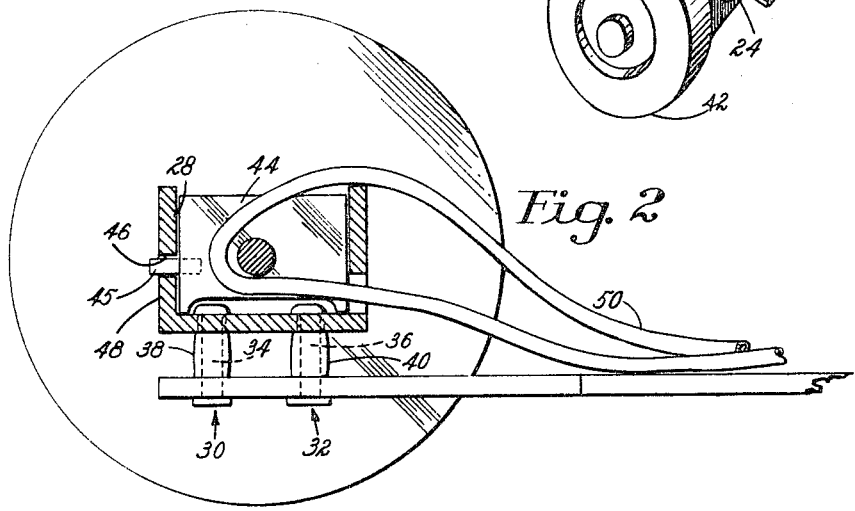
FIG. 2 is a section taken along 2—2 of FIG. 1.

Solid rear axle 24, threaded at 26 along its surface, is journaled in transverse channel 28 which is in turn mounted on frame 12 by two pin assemblies 30, 32 spaced along an axis A—A of the vehicle perpendicular to front axle 10. As best shown in FIG. 2, pin assemblies 30, 32 include pins 34, 36 with secure but loose fitting sleeves 38, 40; channel 28 is thus free to pivot relative to frame 12 somewhat (e.g. 20°) about axis A—A, but is otherwise rigid relative to the frame, maintaining axle 24 perpendicular to that axis. The connections between the pin assemblies 30, 32 and the frame 12 are so located with respect to the positions of the load bearing surfaces of wheels 16, 16 and the centroid X of the entire vehicle that the load on each of the front drive wheels 16, 16 is equal. Because the frame 12 is free to roll, i.e. to pivot laterally about the connections with pin assemblies 30, 32, the wheels 16, 16 will remain substantially equally loaded even when the travel surface is uneven.

Proper location of the pins can be determined empirically. The car is supported, without the rear axle by a pair of knife edged pylons at opposite sides of the intended rear axle location, and by a scale and knife edge at the middle of the front axle. Total weight on the front axle is thus determined. The car is now supported by one pylon under one front wheel and the scale under the other wheel. The other pylon is then moved transversely along the rear axle location until one half of the total front axle load appears on the scale, determining the correct pin location.

Rear wheels 42, aimed straight ahead, rotate freely with axle 24 to which they are keyed. Nut 44 is threaded on axle 24 and is constrained by the walls of channel 28 to move transversely therein as the rear wheels and axle turn; nut 44 together with end wall or stop 52 of channel 28 against which the nut abuts at the end of its lateral travel serve as a clamping means actuated progressively by forward movement of the vehicle and consequent rotation of the threaded shaft portion of axle 24. Pointer extension 45 of nut 44 extends through transverse slot 46 in channel wall 48. Distance calibrations 49 appear on wall 48 above slot 46.

Figure 3:
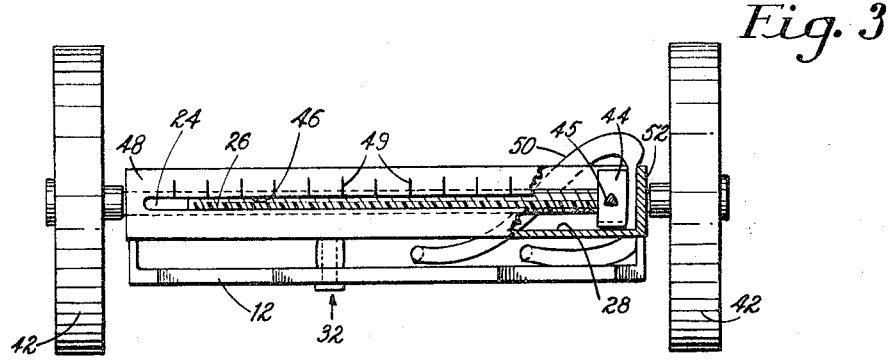
FIG. 3 is a partially exploded rear elevation.

Flexible fuel line 50 is elastically collapsible and extends from fuel tank 53 around axle 24 through the clamping means formed by nut 44 and end wall 52 and back to motor 18. When, upon rotation of axle 24, nut 44 is moved to the right hand end of channel 28 (FIG. 3), line 50 will be clamped shut. At the same time, abutment of the nut against end wall 52 will lock the axle 24 and wheels 42, 42 against further rotation, braking the vehicle to a stop.

Used as a toy, the vehicle is about a foot long and built to the scale of a racing car. A body of any desired design (not shown) may be mounted on frame 12. Speeds of the order of 40 m.p.h. or more may be achieved on a variety of travel surfaces.

In operation, the desired extent of forward movement of the vehicle is set by rotating the rear wheels 42 and axle 24 backwardly until nut 44 has reached the desired position as shown by indicator 45, and the motor is started. Should the travel surface be bumpy, the rear wheel unit will rock about axis A—A, but without changing the equal weight distribution or loading on the front wheels. Straight ahead motion is thus preserved. Upon reaching the preset location, the motor will stop and the vehicle will brake to a halt.

If desired, only one front wheel can be driven, in which event that wheel should be toed-out slightly (the amount to be determined experimentally). The resulting travel of the vehicle is generally straight ahead, but includes small, random weaving perturbations. Two wheel drive is preferable because such weaving is eliminated.

I claim:

1. A toy automotive vehicle comprising
    a pair of unsprung front wheels rigidly directed for generally straight ahead movement, at least one front wheel being driven,
    a motor for driving said front wheel,
    an unsprung non-driven rear wheel unit rigidly directed for straight ahead movement and mounted for rocking movement about a single longitudinal axis of the vehicle, the location of said rear wheel unit being positioned with respect to the centroid of the vehicle and the location of the front wheels so that the load on each of said front wheels is substantially equal during movement of the vehicle along a travel surface, said weight distribution being substantially independent of the instantaneous angular position of the rear wheel unit about said axis.

2. The vehicle of claim 1 wherein both front wheels are driven.

3. The vehicle of claim 1 wherein said rear wheel unit is mounted on said vehicle solely by a pair of pin assemblies spaced along said axis, said assemblies arranged to prevent movement of said unit relative to said vehicle except for said rocking.

4. The vehicle of claim 1 wherein said rocking movement can extend over at least about 20°.

5. The vehicle of claim 3 wherein said pin assemblies comprise pins with loose fitting sleeves.

6. The vehicle of claim 1 wherein said vehicle is provided with clamping means progressively actuated by forward travel of said vehicle, said motor is fluid fueled, and an elastically collapsible fuel line extends through said clamping means arranged to be clamped shut by said clamping means.

7. The vehicle of claim 6 in which said clamping means includes means for braking said vehicle simultaneously with shutting said fuel line.

8. The vehicle of claim 6 in which said clamping means comprises a threaded shaft driven in rotation as the vehicle moves forwardly, a nut constrained against rotation threaded on said shaft, and a stop against which said nut abuts at the end of its travel.

9. The vehicle of claim 8 in which said rear wheel unit comprises a pair of wheels secured to said threaded shaft, arranged so that abutment of said nut against said stop simultaneously clamps shut said fuel line and locks said rear wheels against rotation to brake the vehicle.

References Cited
UNITED STATES PATENTS

| | | | |
|---|---|---|---|
| 2,729,021 | 1/1956 | Lohr | 46—201 X |
| 2,838,875 | 6/1958 | Hammond | 46—201 |
| 3,063,194 | 11/1962 | Berguerand | 46—201 |
| 3,280,500 | 10/1966 | Fairbairn | 46—201 |

ROBERT PESHOCK, *Primary Examiner.*

CHARLES R. WENTZEL, *Assistant Examiner.*

U.S. Cl. X.R.

46—213